(12) United States Patent
Ferrero et al.

(10) Patent No.: US 8,405,897 B2
(45) Date of Patent: Mar. 26, 2013

(54) ELECTRICALLY CONTROLLED OPTICAL OSCILLATOR FOR A SINGLE-SIDE SUBCARRIER OPTICAL PHASE-LOCKED LOOP

(75) Inventors: Valter Ferrero, Rivalta di Torino (IT); Stefano Camatel, Farigliano (IT)

(73) Assignee: Instituto Superiore Mario Boella Sulle Technologie Dell 'Informazione E Delle Telecommunicazioni, Turin (IT)

( * ) Notice: Subject to any disclaimer, the term of this patent is extended or adjusted under 35 U.S.C. 154(b) by 173 days.

(21) Appl. No.: 12/733,143

(22) PCT Filed: Aug. 6, 2008

(86) PCT No.: PCT/IB2008/002059
§ 371 (c)(1),
(2), (4) Date: Jul. 6, 2010

(87) PCT Pub. No.: WO2009/019573
PCT Pub. Date: Feb. 12, 2009

(65) Prior Publication Data
US 2010/0277790 A1 Nov. 4, 2010

(30) Foreign Application Priority Data
Aug. 6, 2007 (IT) .............................. TO2007A0586

(51) Int. Cl.
G02F 1/01 (2006.01)
(52) U.S. Cl. ...................................................... 359/276
(58) Field of Classification Search ................... 359/276
See application file for complete search history.

(56) References Cited

U.S. PATENT DOCUMENTS
6,417,957 B1 * 7/2002 Yao .................................. 359/334
2003/0076567 A1 * 4/2003 Matthews et al. ............. 359/181

FOREIGN PATENT DOCUMENTS
WO WO 2005/027378 3/2005

OTHER PUBLICATIONS

Camatel S. et al.: "Optical Phase-locked Loop for Coherent Detection Optical Receiver," Mar. 18, 2004, Electronics Letters, IEE Stevenage, GB, pp. 384-385, XP006021623, ISSN: 0013-5194.
International Search Report mailed Mar. 2, 2009 in PCT Appln. No. PCT/IB2008/002059.
Michael G. Taylor Ed—Woojin Shin et al.: "Coherent Detection for Optical Communications Using Digital Signal Processing," Mar. 1, 2007, Optical Fiber Communication Conference and Exposition National Fiber Optic Engineers Conference, OFCNFOEC 2007—Mar. 25-29, 2007—Anaheim, CA , IEEE—Piscataway, NJ, pp. 1-3, XP031146571, ISBN: 978-1-55752-831-5.

*Primary Examiner* — James Jones
(74) *Attorney, Agent, or Firm* — Davidson Berquist Jackson & Gowdey, LLP

(57) ABSTRACT

An electrically controlled optical oscillator for a single subcarrier optical phase-locked loop, which includes: an electrically controlled electrical oscillator having an input, which receives an electrical driving input signal, and an output, which supplies an electrical driving output signal that has a frequency that is a function of the electrical driving input signal; a continuous-wave laser source, which supplies an optical carrier; and an optical modulator, which has an optical input connected to the laser source and receives the optical carrier, an electrical input, which is connected to the output of the electrically controlled electrical oscillator and receives the electrical driving output signal, and an optical output that modulates the optical carrier with the electrical driving output signal and generates an optical modulated signal. The optical modulator generates an optical modulated signal with single optical subcarrier.

17 Claims, 5 Drawing Sheets

ELECTRICALLY CONTROLLED OPTICAL OSCILLATOR FOR A SINGLE-SIDE SUBCARRIER OPTICAL PHASE-LOCKED LOOP

FIELD OF THE INVENTION

The present invention relates to an electrically controlled optical oscillator for a single-side-subcarrier optical phase-locked loop.

BACKGROUND OF THE INVENTION

Optical phase-locked loops (OPLLs) are optical devices used in frequency synthesis and in coherent demodulation in optical communication systems for local generation of an optical signal with a frequency and a phase that track those of an optical input signal.

In particular, an OPLL is basically formed by an optical phase detector, an electrical loop filter, and an optical voltage-controlled oscillator (OVCO) comprising a non-modulated optical source, an electrical voltage-controlled oscillator, and an optical amplitude modulator, which is designed to modulate the optical carrier supplied by the non-modulated optical source with the electrical modulating signal supplied by the electrical voltage-controlled oscillator.

In particular, the phase detector receives an optical signal to be locked and a locked optical signal—i.e., one having a frequency and a phase "locked" to those of the optical input signal—, which is supplied by the OVCO, and supplies an electrical error signal indicating the difference of phase existing between the optical input signals.

The electrical error signal generated by the phase detector is supplied to the loop filter, which has a transfer function of a low-pass type and supplies a filtered electrical error signal that is then supplied to the OVCO, which supplies the aforementioned locked optical signal, the instantaneous frequency of which varies proportionally with the amplitude of the filtered electrical signal.

OVCOs are generally obtained with solid-state laser or tunable-semiconductor laser that can be modulated directly, which, although used in the past, present, however, certain drawbacks that markedly condition the use of the OPLLs in which they are inserted.

In particular, although presenting undoubted qualities in terms of spectral efficiency and functionality (insensitivity to non-linear effects) deriving from the reduced linewidth of the solid-state lasers, OPLLs that use OVCOs based upon solid-state lasers are, however, difficult to apply to optical communications systems, in so far as it is somewhat difficult to find solid-state lasers functioning in the frequency grid set down by ITU (International Telecommunication Union). In addition, solid-state lasers are very voluminous and cumbersome, require a lot of power for their operation and are more costly than OPLLs that use OVCOs based upon semiconductor lasers.

OPLLs that use OVCOs based upon semiconductor lasers, although considerably less costly than OPLLs that use OVCOs based upon solid-state lasers, require, however, the use of a distributed-feedback (DFB) technology, which requires the use of wide-band electronic feedback circuits on account of the considerable linewidth of directly controlled semiconductor lasers, and an injection current that is extremely high on account of the non-ideal operation of said devices.

The constant market request for increasingly high data-transmission rates means that the high spectral efficiency and the insensitivity to the non-linear effects of OPLLs will constitute a fundamental factor in next-generation optical communication systems. In fact, from an observation of the evolution of current transmission systems, it may immediately be noted that the performance of standard intensity-modulation direct-detection (IM-DD) transmission systems based upon the "no return to zero" (NRZ) format or the "return to zero" (RZ) format are increasingly approaching the theoretical limits in terms of spectral efficiency and insensitivity to non-linear effects. For these reasons, in order to improve the performance of optical communications systems, the only solution that can currently be pursued would appear to be that of a considerable modification of the structure of the transmission system, for example using, in transmission, phase, frequency, and amplitude modulations and possible combinations thereof, such as, for example, phase shift keying (PSK), frequency shift keying (FSK), quadrature amplitude modulation (QAM), and, in reception, coherent homodyne detection.

By way of example, a PSK binary transmission system with coherent homodyne detection has a sensitivity that is better by 3.5 dB than a standard IM-DD transmission system with NRZ format. Said advantage may be used to reduce by approximately 3.5 dB the mean optical power required for each transmission channel. In terms of peak power there is hence obtained a reduction of approximately 6.5 dB, with consequent drastic reduction in the non-linear effects in the fibre, which are a source of degradation of the performance.

As further example, a 4-PSK transmission system has a spectral occupation that is half that of a standard binary transmission system with NRZ format.

In the literature there exist OPLLs that endeavour to overcome the above drawbacks and are based upon subcarrier modulation, such as, for example, the oscillator optical described in the patent application No. EP 1673883.

SUBJECT AND SUMMARY OF THE INVENTION

The present applicant has noted that OPLLs according to the known art are far from suitable for use in optical telecommunications systems based upon the most recent techniques of dense wavelength-division multiplexing (DWDM). In this regard, in fact, the present applicant has verified that, in order to use OPLLs of a known type in optical telecommunications systems based upon DWDM techniques it would be necessary to increase considerably the operating range of frequencies of the VCO even up to 40-50 GHz or more, with consequent greater complexity of construction and, hence, increase in the cost of said component.

The aim of the present invention is to provide an electrically controlled optical oscillator that will enable the above drawback to be overcome at least in part.

According to the present invention, a single-side-subcarrier electrically controlled optical oscillator for an optical phase-locked loop and an optical phase-locked loop comprising said single-side-subcarrier electrically controlled optical oscillator are provided, as defined in the annexed claims.

DESCRIPTION OF THE FIGURES

For a better understanding of the present invention a preferred embodiment thereof is now described, purely by way of non-limiting example and with reference to the attached drawings, wherein.

DETAILED DESCRIPTION OF THE INVENTION

Figure 1:
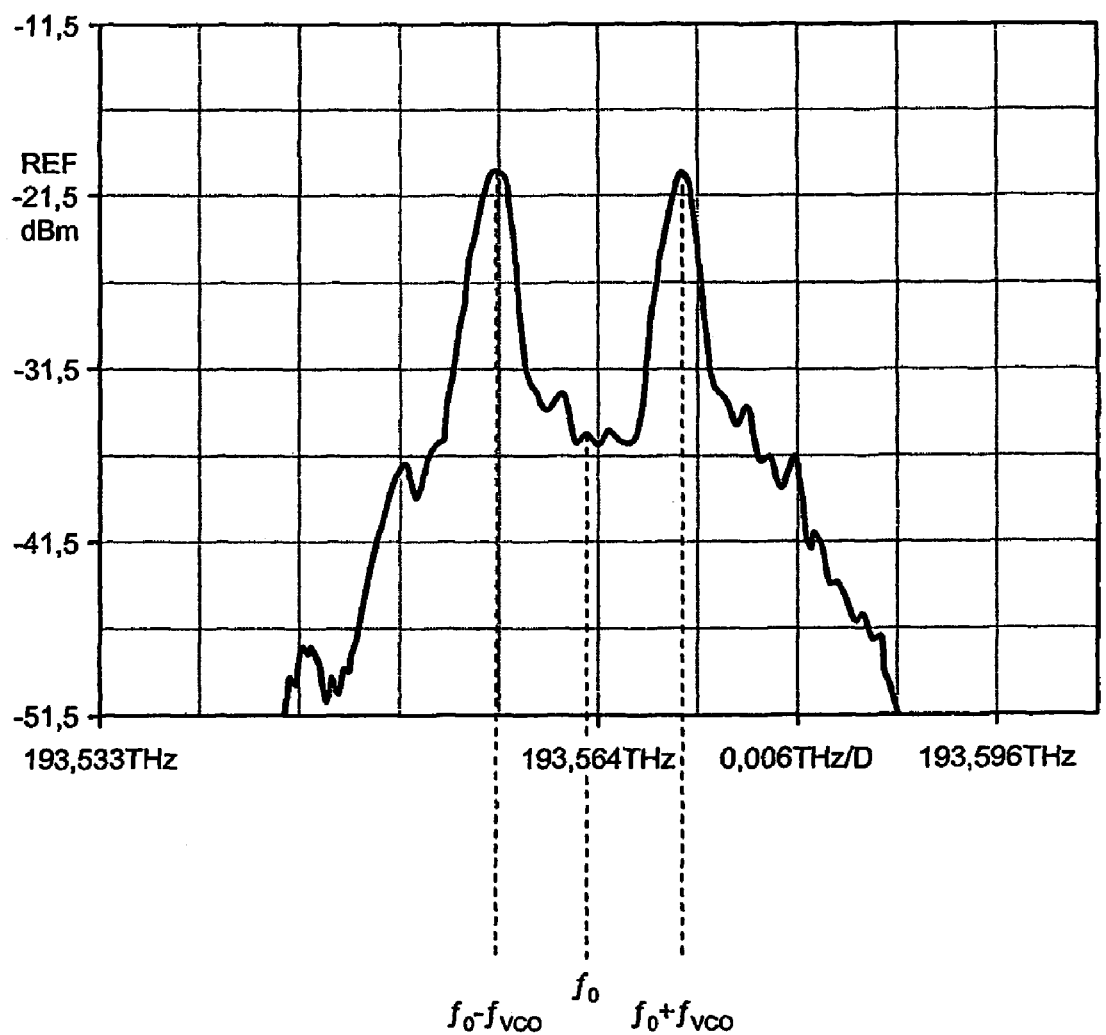
FIG. 1 shows a power spectrum at output from an electrically controlled optical oscillator according to the known art.

The present invention stems from the realization by the present applicant whereby the limitation indicated above of OPLLs based upon subcarrier modulation is due to the fact that the locked optical signal has a frequency spectrum comprising, in addition to a useful subcarrier for locking the optical signal received, also a spurious subcarrier of a power comparable to that of the useful subcarrier, as illustrated in FIG. 1, where $f_0$ is the frequency of an optical signal to be modulated and $f_{VCO}$ is the modulation frequency. In optical telecommunications systems based upon DWDM techniques, this spurious subcarrier gives rise to beats with the DWDM optical signals, which considerably limit the performance of the OPLL. In order to prevent said beats, as has been mentioned above, the operating range of frequencies of the VCO would have to be increased up to values such as to render necessary the use of particularly complex and hence costly VCOs.

Starting from this realization, the idea underlying the present invention is to improve the performance of OPLLs with subcarrier modulation using an OVCO that will supply a locked optical signal having a frequency spectrum comprising a single optical subcarrier.

Figure 2:
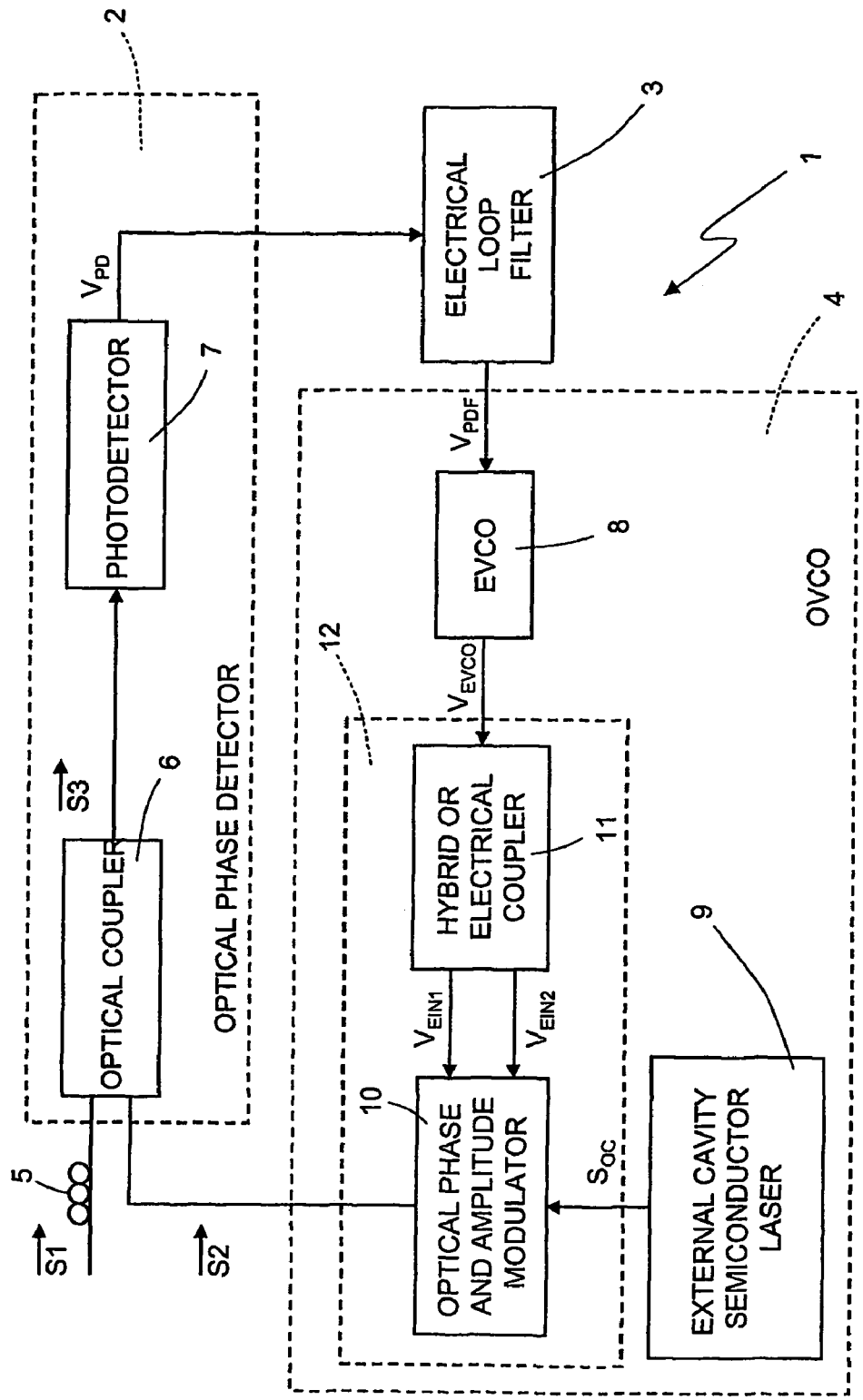
FIG. 2 shows a block diagram of an optical phase-locked loop according to the invention.

FIG. 2 illustrates the block diagram of an OPLL implementing the idea underlying the present invention.

In particular, the OPLL, designated as a whole by 1, comprises an optical phase detector 2, an electrical loop filter 3, a single-side-subcarrier OVCO 4, and a polarization controller 5.

The optical phase detector 2 comprises an optical coupler 6, which receives at input an optical signal to be locked $\vec{S}_1$ and a locked optical signal $\vec{S}_2$ supplied by the OVCO 4 and supplies at output a coupled optical signal $\vec{S}_3$.

In particular, if, for reasons of simplicity, it is assumed that we are working on monochromatic signals, and if we adopt the following notation:

$$\vec{S}_1 = S_1 \cdot e^{j(\omega_1 t + \phi_1)} \cdot \hat{s}_1$$

$$\vec{S}_2 = S_2 \cdot e^{j(\omega_2 t + \phi_2)} \cdot \hat{s}_2$$

where:

$S_1$, $S_2$ are the amplitudes of the electromagnetic fields $\vec{S}_1$ and $\vec{S}_2$, $\omega_1$, $\omega_2$ are the optical pulsations of $\vec{S}_1$ and $\vec{S}_2$, $\phi_1$, $\phi_2$ are the optical phases of $\vec{S}_1$ and $\vec{S}_2$, and $\hat{s}_1$, $\hat{s}_2$ are the optical polarizations of $\vec{S}_1$ and $\vec{S}_2$, the coupled optical signal $\vec{S}_3$ supplied by the optical coupler 6 can be represented by the following general expression:

$$\vec{S}_3 = \vec{S}_1' + \vec{S}_2' = k_1 \cdot S_1 \cdot \hat{s}_1' \cdot e^{j(\omega_1 t + \phi_1 + \phi_1')} + k_2 \cdot S_2 \cdot \hat{s}_2' \cdot e^{j(\omega_2 t + \phi_2 + \phi_2')}$$

where:

$$\hat{s}_1' = \hat{s}_1 \cdot M_1$$

$$\hat{s}_2' = \hat{s}_2 \cdot M_2$$

and where:

$k_1$, $k_2$ are factors of attenuation of the amplitudes of the electromagnetic fields $\vec{S}_1$ and $\vec{S}_2$, introduced on the output by the optical coupler, $\phi_1'$, $\phi_2'$ are the phase shifts introduced on the output by the optical coupler, $\hat{s}_1'$, $\hat{s}_2'$ are the optical polarizations of $\vec{S}_1$ and $\vec{S}_2$ on the output of the optical coupler, and $M_1$, $M_2$ are the (2×2) matrices of rotation of the optical polarizations of $\vec{S}_1$ and $\vec{S}_2$.

An example of optical coupler 6 can be represented by an ideal 3-dB coupler, where:

$$\varphi_{1'} = 0°;\ \varphi_{2'} = 90°;\ k_1 = k_2 = 1/\sqrt{2},\ M_1 = M_2 = \begin{bmatrix} 1 & 0 \\ 0 & 1 \end{bmatrix}$$

A further example of optical coupler 6 can be represented by an ideal 90° hybrid coupler, which is an optical device having two optical outputs, which supply, respectively, an optical signal $\vec{S}_3$ and an optical signal $\vec{S}_4$ the general expressions of which are the following:

$$\vec{S}_3 = \vec{S}_{1\_out1}' + \vec{S}_{2\_out1}' = k_{1\_out1} \cdot S_1 \cdot \hat{s}_{1\_out1}' \cdot e^{j(\omega_1 t + \phi_1 + \phi_{1\_out1}')} + k_{2\_out1} \cdot S_2 \cdot \hat{s}_{2\_out1}' \cdot e^{j(\omega_2 t + \phi_2 + \phi_{2\_out1}')}$$

$$\vec{S}_4 = \vec{S}_{1\_out2}' + \vec{S}_{2\_out2}' = k_{1\_out2} \cdot S_1 \cdot \hat{s}_{1\_out2}' \cdot e^{j(\omega_1 t + \phi_1 + \phi_{1\_out2}')} + k_{2\_out2} \cdot S_2 \cdot \hat{s}_{2\_out2}' \cdot e^{j(\omega_2 t + \phi_2 + \phi_{2\_out2}')}$$

where:

$$\varphi_{2'out1}' = \varphi_{1'out1}';\ k_{1\_out1} = k_{2\_out1} = 1/\sqrt{2},$$

$$M_{1\_out1} = M_{2\_out1} = \begin{bmatrix} 1 & 0 \\ 0 & 1 \end{bmatrix}$$

$$\varphi_{2'out2}' = \varphi_{1'out2}' + 90°;\ k_{1\_out2} = k_{2\_out2} = 1/\sqrt{2},$$

$$M_{1\_out2} = M_{2\_out2} = \begin{bmatrix} 1 & 0 \\ 0 & 1 \end{bmatrix}$$

and where:

$k_{1\_out1}$, $k_{2\_out1}$ are factors of attenuation of the amplitudes of the electromagnetic fields $\vec{S}_1$ and $\vec{S}_2$ introduced on the first output by the optical coupler, $k_{1\_out2}$, $k_{2\_out2}$ are factors of attenuation of the amplitudes of the electromagnetic fields $\vec{S}_1$ and $\vec{S}_2$ introduced on the second output by the optical coupler, $\phi_{1'out1}'$, $\phi_{2'out1}'$ are the phase shifts introduced on the first output by the optical coupler, $\phi_{1'out2}'$, $\phi_{2'out2}'$ are the phase shifts introduced on the second output by the optical coupler, $\hat{s}_{1'out1}'$, $\hat{s}_{2'out1}'$ are the optical polarizations of $\vec{S}_1$ and $\vec{S}_2$ on the first output of the optical coupler, $\hat{s}_{1'out2}'$, $\hat{s}_{2'out2}'$ are the optical polarizations of $\vec{S}_1$ and $\vec{S}_2$ on the second output of the optical coupler, $M_{1\_out1}$, $M_{2\_out1}$ are the (2×2) matrices of rotation of the optical polarizations of $\vec{S}_1$ and $\vec{S}_2$ on the first output of the optical coupler, and $M_{1\_out2}$, $M_{2\_out2}$ are the (2×2) matrices of rotation of the optical polarizations of $\vec{S}_1$ and $\vec{S}_2$ on the second output of the optical coupler.

The phase detector 2 further comprises a photodetector 7, which receives the coupled optical signal $\vec{S}_3$ generated by the optical coupler 6 and supplies an electrical error voltage signal $V_{PD}$ indicating the phase difference between the optical signal to be locked $\vec{S}_1$ and the locked optical signal $\vec{S}_2$.

The electrical error signal is then supplied to the electrical loop filter 3, which is a filter of the type commonly used in electrical phase-locked loops and supplies at output a filtered electrical error signal $V_{PDF}$.

The filtered electrical error signal $V_{PDF}$ is then supplied to the OVCO 4, which generates at output the aforementioned locked optical signal $\vec{S}_2$, the frequency of which varies proportionally with the amplitude of the filtered electrical error signal $V_{PDF}$.

The polarization controller 5 is set in a position corresponding to the input of the optical coupler 6 on which the optical signal to be locked is received, and modifies, in a way in itself known and hence not described in detail, the optical polarization of the optical signal to be locked in such a way that the optical polarizations of the optical signal to be locked and of the locked optical signal will be parallel to one another at input to the photodetector 7.

The OVCO 4 comprises an electrical voltage-controlled oscillator (EVCO) 8, a continuous-wave laser source 9, an optical modulator 10, and an electrical directional coupler 11.

The EVCO 8 is an oscillator having a free frequency of oscillation of its own which can be defined in the design stage and the output of which is constituted by a sinusoidal signal the frequency deviation of which with respect to the free frequency of oscillation is proportional to the amplitude of the electrical signal supplied on its input. In the specific case, the EVCO 8 receives at input the filtered electrical error signal $V_{PDF}$ supplied by the electrical loop filter 3 and supplies at output an electrical modulating signal $V_{EVCO}$ constituted by a voltage having a sinusoidal pattern with a frequency that is a function of the amplitude of the filtered electrical error signal $V_{PDF}$.

The continuous-wave laser source 9 is constituted by a semiconductor-laser source with external cavity of the type commonly available on the market and produced using the DFB technology typical for applications of the DWDM type and generating an optical carrier $S_{OC}$, i.e., a practically monochromatic optical signal, that is, a signal having an optical electromagnetic field with a "quasi ideally" sinusoidal pattern, and adjustable optical frequency.

The electrical directional coupler 11 receives at input the (sinusoidal) signal $V_{EVCO}$ generated by the EVCO 8 and supplies on the electrical outputs two electrical (sinusoidal) modulating signals $V_{EIN1}$ and $V_{EIN2}$ at the same frequency and the phases of which respect a specific relationship, substantially a relationship of quadrature. The considerations made previously on the optical coupler can be applied also to the present electrical directional coupler.

Finally, the optical modulator 10 has two electrical inputs on which it receives the two electrical modulating signals $V_{EIN1}$ and $V_{EIN2}$ supplied by the electrical directional coupler 11, an optical input, on which it receives the optical signal to be modulated, and an optical output, on which it supplies the modulated signal.

Figure 3:
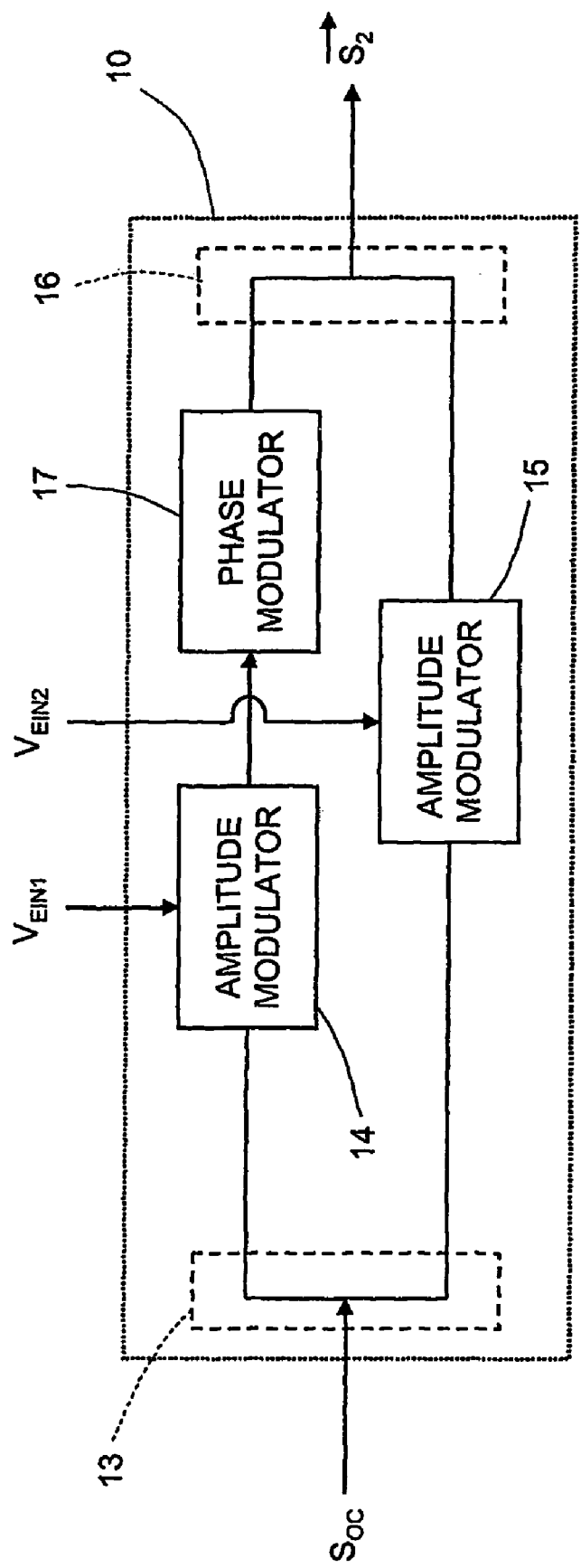
FIG. 3 shows a block diagram of a possible implementation of a phase-and-amplitude optical modulator.

For the OVCO 4 to be of the single-side-subcarrier type, the optical modulator 10 is of the type designed to generate a single-side-subcarrier optical signal. In particular, unlike the known art in which the optical modulator is of the type with just amplitude modulation, the optical modulator 10 is conveniently of the type with both phase and amplitude modulation, an embodiment of which is illustrated in FIG. 3.

With reference to this figure, the optical phase-and-amplitude modulator 10 comprises two optical couplers 13 and 16, two optical amplitude modulators 14, 15 and an adjustable optical phase-shifter 17, which can be implemented with an optical phase modulator controlled by an appropriate signal. In detail, the optical couplers 13 and 16 are arranged so as to form a first optical path and a second optical path. The first optical path comprises the optical amplitude modulator 14, applied on the input of which is the electrical signal $V_{EIN1}$, and the adjustable optical phase-shifter 17, which is connected in series to the aforesaid optical amplitude modulator 14; the second optical path comprises the optical amplitude modulator 15, applied on the input of which is the electrical signal $V_{EIN2}$.

From an operative standpoint, the optical phase-and-amplitude modulator 10 receives on the optical input the optical carrier $S_{OC}$ generated by the laser source 9 and supplies on the optical output the aforementioned locked optical signal $\vec{S}_2$, having phase and amplitude that depend upon the electrical signal $V_{EVCO}$ generated by the EVCO 8, as will be described hereinafter. Consequently, it is in general possible to consider the pair constituted by the electrical directional coupler 11 (alternatively, the electrical hybrid coupler) and by the optical phase-and-amplitude modulator 10 as optical modulator means 12, provided with an optical input, which receives the optical carrier $S_{OC}$, an electrical input, which receives the electrical modulating signal, and an optical output, which supplies the optical modulated signal $\vec{S}_2$.

Operation of the OPLL 1 will be described hereinafter starting from that of the OVCO 4 and assuming that the following operative conditions of the OVCO 4 itself are met:
a) each of the points of operation at rest (i.e., in the absence of modulating signal) of the optical amplitude modulators 14, 15 is positioned on one of the minima of the corresponding electro-optical transfer function F(V) (defined as the relation between the optical power at output from the modulator and the voltage applied at input to the modulator itself), which, as is known, has a periodic pattern of a squared-cosine type as a function of the voltage applied and is variable between a maximum value and a minimum value (typically almost zero);
b) the adjustable optical phase-shifter is adjustable so as to introduce a phase shift of 90° (for example, in the case of a phase modulator, said phase modulator is controlled by an appropriate adjustment signal);
c) the extinction ratio (ER) of the optical amplitude modulators 14, 15 that constitute the optical phase-and-amplitude modulator 10 is sufficiently high (ER>15 dB), said extinction ratio ER being defined as $$ER = 10\log_{10}\frac{\max[F(V)]}{\min[F(V)]}$$

d) the amplitude of the electrical modulating signals $V_{EIN1}$ and $V_{EIN2}$ supplied respectively to the optical amplitude modulators 14 and 15 is not greater than the voltage $V_\pi$, defined as the difference in voltage V applied to each of the optical amplitude modulators 14 and 15 between a point of maximum and a point of minimum of the electro-optical transfer function F(V) of the optical amplitude modulators themselves.

In said operating conditions the OVCO 4 functions in the so-called mode with suppressed carrier and with generation of a single subcarrier (single side subcarrier optical voltage-controlled oscillator, SS-SC-OVCO).

Figure 4:
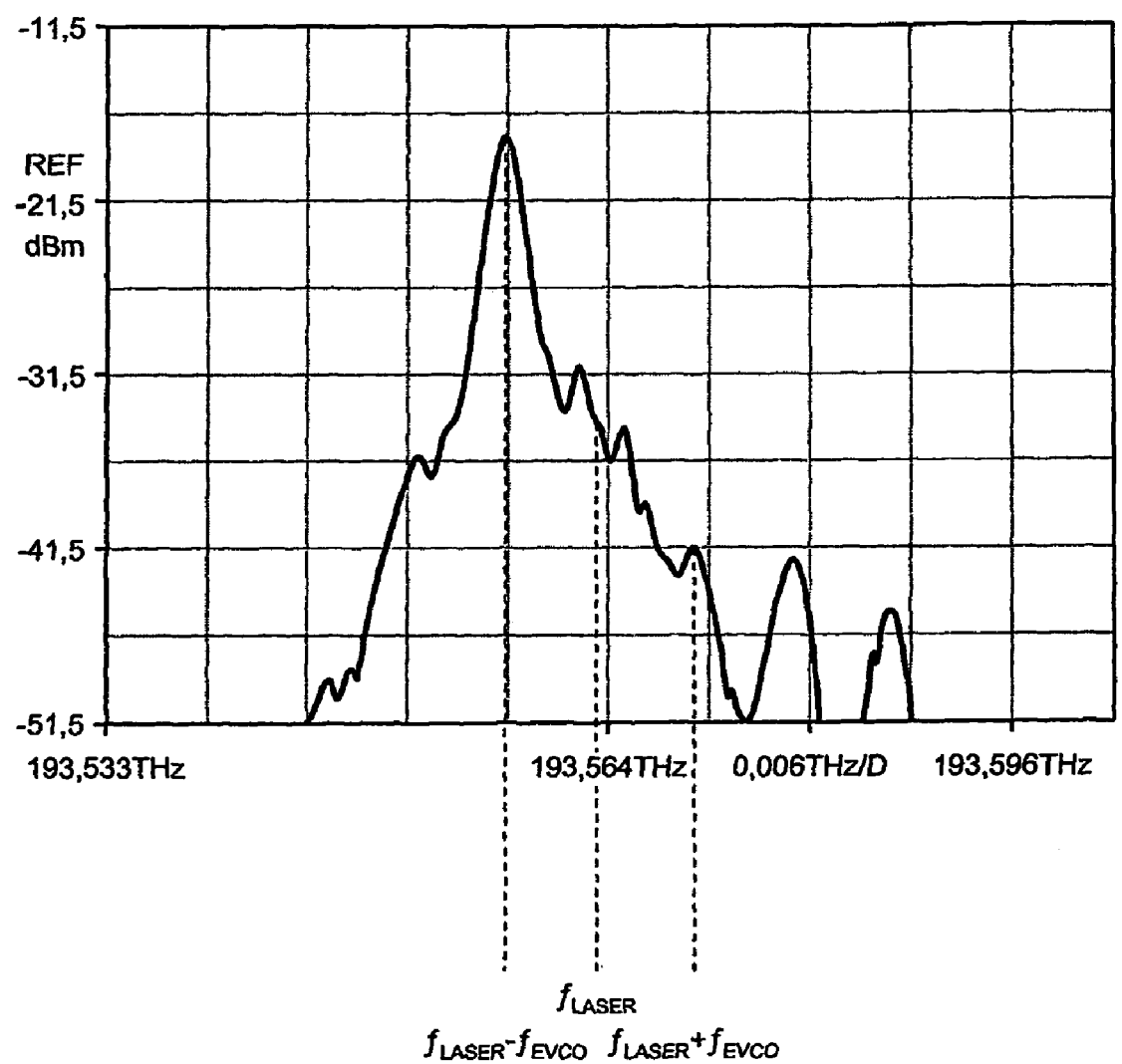
FIG. 4 shows a power spectrum at output from an electrically controlled optical oscillator according to the invention.

In fact, as illustrated in FIG. 4, if $F_{LASER}$ is the optical frequency of the optical carrier $S_{OC}$ generated by the laser source 9 and $F_{EVCO}$ is the electrical frequency of the electrical modulating signal $V_{EVCO}$ generated by the EVCO 8, the power spectrum of the output signal of the optical phase-and-amplitude modulator 10 contains:

a main spectral line at the frequency $F_{LASER}-F_{EVCO}$ (single subcarrier);

a spurious spectral line at the frequency $F_{LASER}$;

a spurious spectral line at the frequency $F_{LASER}+F_{EVCO}$; and further spurious spectral lines at the frequencies $F_{LASER}-n \cdot F_{EVCO}$ and $F_{LASER}+n \cdot F_{EVCO}$ where n is an integer greater than one.

Both of the spurious lines are attenuated with respect to the main spectral line by a factor determined substantially by the extinction ratio of the modulator as regards the spurious line at the frequency $F_{LASER}$, and by a factor determined jointly by the characteristics of the optical phase-and-amplitude modulator 10, and by the electrical directional coupler 11 as regards the spurious spectral line at the frequency $F_{LASER}+F_{EVCO}$.

In this way, at output from the optical phase-and-amplitude modulator 10 an optical signal is obtained having a single main spectral line (single subcarrier) with a frequency and phase proportional to the electrical driving signal of the EVCO 8, whence the name cited previously of "single-side-subcarrier optical voltage-controlled oscillator".

On the basis of what has been described above, it may be immediately appreciated how the present invention enables, with the use of components commonly available on the market, provision of an OVCO 4 that is able to replace the traditional OVCOs obtained with tunable solid-state or semiconductor laser, or else OVCOs based upon subcarrier modulation (SC-OVCO). In fact, the optical signal $\vec{S}_2$ supplied by the OVCO 4 has an optical spectrum that is constituted by a main spectral line (single subcarrier), the frequency and phase of which are controlled directly by the filtered electrical error signal $V_{PDF}$ at input to the OVCO 4, said input coinciding with that of the EVCO 8.

Operation of the OPLL 1, which in what follows will be referred to also as single-side-subcarrier optical phase-locked loop (SS-SC-OPLL), is similar to that of an OPLL that uses a traditional OVCO, obtained with solid-state laser or semiconductor laser, or else an OVCO based upon subcarrier modulation (SC-OPLL).

In fact, assuming the choice of just the main spectral line from amongst all the ones present in the optical signal $\vec{S}_2$ (referred to hereinafter, for convenience, as "main line"), the difference between the phase of the optical signal $\vec{S}_1$ and the phase of the main line of the optical signal $\vec{S}_2$ supplied by the phase detector 2 represents an error signal used for driving the EVCO 8, which supplies at output a sinusoidal voltage $V_{EVCO}$ the frequency of which is proportional to said error.

Consequently, thanks to the fact that the phase of the main line of the optical signal $S_2$ at output from the optical phase-and-amplitude modulator 10 follows the variations of the electrical signal $V_{PDF}$, and given that the latter is a function of the frequency $F_{EVCO}$ of the sinusoidal signal $V_{EVCO}$ supplied at output from the EVCO 8, the state of operation of the OPLL 1 evolves in such a way as to cancel out the phase error existing between the optical signal $\vec{S}_1$ and the main line of the optical signal $\vec{S}_2$.

In fact, using the main line ($F_{LASER}-F_{EVCO}$) of the output power spectrum of the optical phase-and-amplitude modulator 10 and using an EVCO 8 in which the frequency of the sinusoidal output voltage is proportional to the driving signal supplied on its input, if the frequency (or phase) of the optical signal $\vec{S}_1$ tends to increase, then also the difference between the frequency (or phase) of the optical signal $\vec{S}_1$ and the frequency (or phase) of the main line ($F_{LASER}-F_{EVCO}$) of the optical signal $\vec{S}_2$ tends to increase, and hence also the amplitude of the driving signal of the EVCO 8 tends to increase, thus causing an increase in the frequency $F_{EVCO}$ of the sinusoidal voltage $V_{EVCO}$ supplied by the EVCO 8, thus countering the increase in the frequency (or phase) difference between the optical signal $\vec{S}_1$ and the frequency (or phase) of the main line ($F_{LASER}-F_{EVCO}$) of the optical signal $\vec{S}_2$.

Obviously, considerations of a similar nature can be made in the case where, following upon the use of particular categories of modulators and/or electrical directional couplers or particular adjustments, the main line is the one at the frequency $F_{LASER}+F_{EVCO}$ (and the frequency line $F_{LASER}-F_{EVCO}$ is hence the spurious one) of the output power spectrum of the optical phase-and-amplitude modulator 10.

According to a further aspect of the present invention, the choice of the spectral line of the output power spectrum of the optical phase-and-amplitude modulator 10 that must be used as main line can be obtained by adjusting the optical frequency $F_{LASER}$ of the optical carrier $S_{OC}$ supplied by the external-cavity semiconductor laser 9 in such a way that the frequency of the main line is as close as possible to the frequency $F_{INPUT}$ of the optical signal $S_1$, i.e., it falls within the locking bandwidth of the OPLL 1.

In fact, assuming that the frequency $F_{INPUT}$ of the optical signal $\vec{S}_1$ is close to the frequency $F_{LASER}-F_{EVCO}$ of the main spectral line of the output power spectrum of the optical phase-and-amplitude modulator 10, after coupling of the optical signal $\vec{S}_1$ with the optical signal $\vec{S}_2$, the beat, introduced by the photodetection, between the frequency of the optical signal $\vec{S}_1$, i.e., $F_{INPUT}$, and the three main frequencies of the spectrum of the optical signal $\vec{S}_2$, i.e., $F_{LASER}$, $F_{LASER}-F_{EVCO}$ and $F_{LASER}+F_{EVCO}$, generates a series of spectral lines at different frequencies. One of the aforesaid spectral lines is in baseband (at exactly 0 Hz if the OPLL 1 is locked), whilst the other spectral lines are spurious and at frequencies of $\pm n \cdot F_{EVCO}$. Said spurious spectral lines are eliminated by the filtering introduced by the electrical loop filter 3, appropriately designed, and by the photodetector 7.

Consequently, after filtering, only the beat between the main spectral line and the signal to be locked remains in baseband, said beat representing the filtered electrical error signal $V_{PDF}$, used for driving the EVCO 8.

The main advantages of the SS-SC-OPLL according to the present invention are outlined in what follows.

The use of an external optical modulator and an EVCO enables an extreme accuracy in the synthesis of the optical frequency, to the extent that this is limited only by the characteristics of the EVCO. Currently, EVCOs are commercially available with electrical frequencies that are even very high (50-60 GHz) and a relatively wide range of tunability (~10-100 MHz). The alternative solutions mentioned previously (solid-state laser or semiconductor EVCO) require instead an extreme accuracy in the control of the biasing current of directly modulated semiconductor lasers, which are somewhat problematical to produce.

The scheme of construction of the OVCO proposed enables a practically ideal frequency translation, the linearity of which as a function of the applied voltage is limited only by the linearity of the EVCO and not by the optical components used. A further advantage is due to the translation in frequency not affected by any spurious amplitude modulation, thanks to the signal at output from the EVCO, the amplitude of which is constant throughout its range of operation. In the other solutions, based upon direct control of the semiconductor laser, the translation in frequency is always accompanied by a spurious amplitude modulation that must necessarily be compensated for by a purposely provided electrical or optical circuit.

As compared to optical oscillators based upon subcarriers (SC-OPLL) present in the known art, the scheme of construction proposed in the present application enables generation of a spectrally purer locked signal $S_2$. In fact, said locked signal $S_2$ comprises a single main spectral line, whilst in the case of SC-OPLL the main lines are two, and only one is used for locking, whilst the second is a spurious line having a power equal to the one used for locking, with consequent limitation of the fields of use of the SC-OPLL.

The design of the SS-SC-OPLL proposed, based upon an EVCO and an external optical modulator, which, once coupled together, are equivalent to an OVCO, can be performed by exploiting the theory on electrical PLLs that is well known and was developed some time ago. The other solutions, instead, require a specific design based upon the peculiarity of the directly modulated laser that is used.

The laser used as direct oscillator is a non-modulated (i.e., CW) laser. It is therefore possible to use an external-cavity semiconductor laser slowly tunable in wavelength. With this solution there is the advantage of having both a fast tunability on a limited range of frequencies thanks to the OVCO and a slow tunability on a wide range of wavelengths, thanks to the direct control of the parameters, available on every commercial tunable laser. In the other solutions, instead, non-commercial laser sources are required that are to be purposely developed.

Finally, given that in SS-SC-OPLLs a single subcarrier is generated, there are no constraints on the frequency of the output signal of the EVCO.

Finally, it is clear that modifications and variations can be made to the SS-SC-OPLL and OVCO described and illustrated herein without thereby departing from the scope of protection of the present invention, as defined in the annexed claims.

For example, the operating condition whereby the points of operation at rest of the optical amplitude modulators inside the phase-and-amplitude modulator must coincide with the minima of the electro-optical transfer functions F(V) of the modulators themselves is not strictly necessary for proper operation of the OVCO 4. In fact, in the case where said condition were not satisfied and hence the point of operation at rest of the optical amplitude modulators internal to the optical phase-and-amplitude modulator 10 were not located on a minimum of the electro-optical transfer function of the modulator itself, the power spectrum of the output signal of the optical phase-and-amplitude modulator 10 would contain a spectral line at the frequency $F_{LASER}$ having a non-negligible amplitude with respect to the main spectral line of interest (single subcarrier); said spectral line would be, however, in any case eliminated in the filtering performed by the electrical loop filter 3 and possibly also by the photodetector 7.

In addition, the polarization controller 5 through which the optical polarizations of the optical signal to be locked and of the locked optical signal are kept parallel to one another at input to the photodetector 7 must not necessarily be set at the input of the optical coupler 6 on which the optical signal to be locked arrives, but can be set in any other point of the OPLL 1 in which, in any case, it is able to operate for keeping the optical polarizations of the optical signal to be locked and of the locked optical signal parallel to one another at input to the photodetector 7; for example, it could be set at the output of the optical phase-and-amplitude modulator 10.

Figure 5:
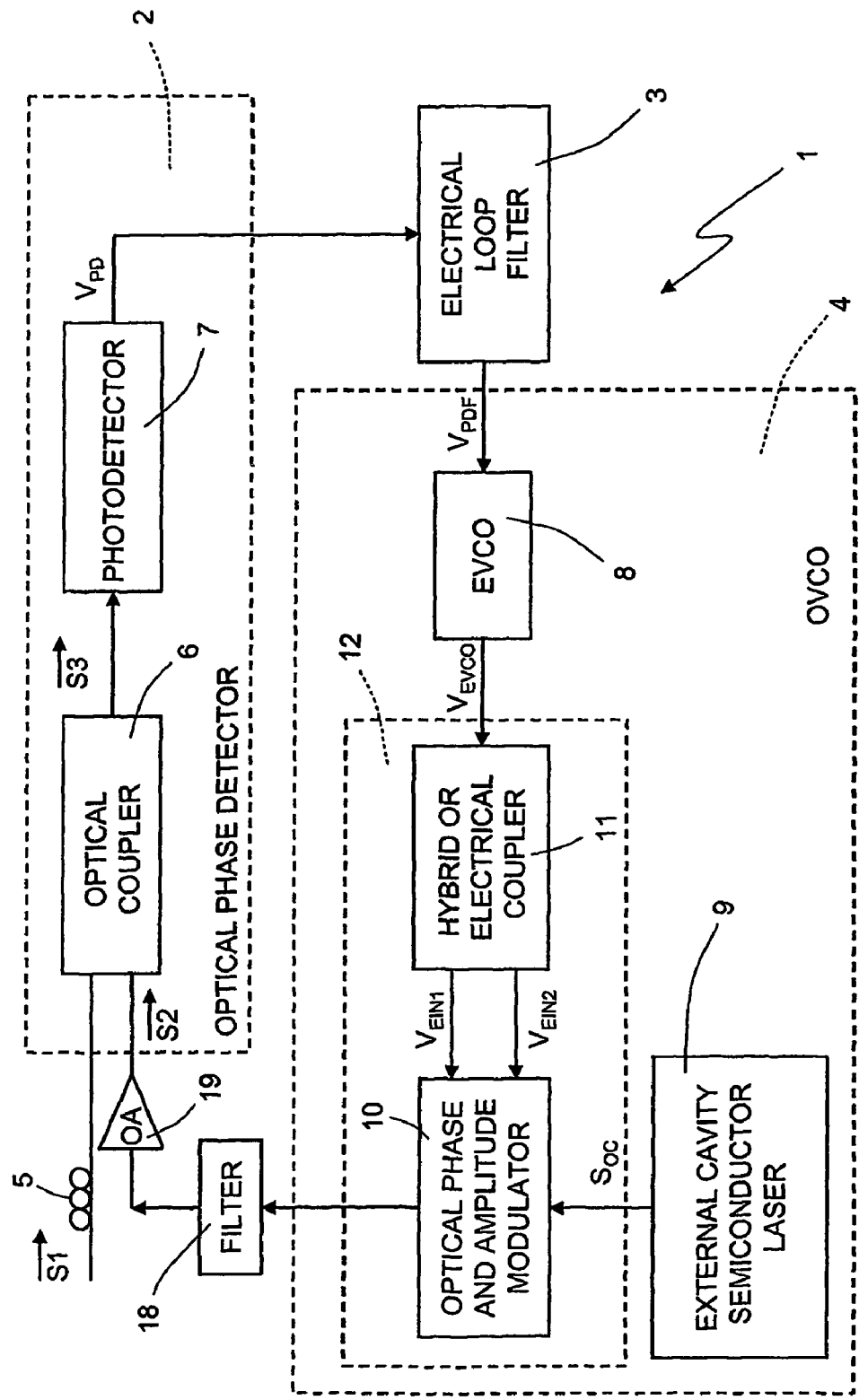
FIG. 5 shows a block diagram of a different embodiment of the present invention.

Likewise, it is possible to set between the output of the optical phase-and-amplitude modulator 10 and the optical coupler 6 of the optical phase detector 2 an optical amplifier (OA) 19 and/or an optical filter 18, as is shown, by way of example, in FIG. 5.

Finally, the EVCO 8 could be of a type different from the one previously described, and in particular, instead of being an electrical voltage-controlled oscillator, may also be an electrical current-controlled oscillator. In the latter case, therefore, the OVCO 4 would likewise become an optical current-controlled oscillator.

The invention claimed is:

1. An electrically controlled optical oscillator for a single-side-subcarrier optical phase-locked loop, comprising:
   electrically controlled electrical oscillator having an input configured for receiving an electrical driving input signal ($V_{PDF}$) and an output configured for supplying an electrical driving output signal ($V_{EVCO}$) having a frequency ($F_{EVCO}$) that is a function of said electrical driving input signal ($V_{PDF}$);
   a continuous-wave laser source configured for supplying an optical carrier ($S_{OC}$); and
   optical modulator having an optical input connected to said laser source for receiving said optical carrier ($S_{OC}$), an electrical input connected to said output of said electrically controlled electrical oscillator for receiving said electrical driving output signal ($V_{EVCO}$), and an optical output configured for modulating said optical carrier ($S_{OC}$) with said electrical driving output signal ($V_{EVCO}$) and thus generating an optical modulated signal ($\vec{S}^7{}_2$);
   wherein said optical modulator is configured for generating an optical modulated signal ($\vec{S}_2$) with a single optical subcarrier.

2. The electrically controlled optical oscillator according to claim 1, wherein said optical modulator comprises an optical phase-and-amplitude modulator.

3. The electrically controlled optical oscillator according to claim 2, wherein said optical modulator further comprises an electrical device having an electrical input configured for receiving an electrical input signal, and two electrical outputs, which are configured for supplying respective electrical output signals having frequencies equal to the frequency of the electrical input signal and phases that respect a given relationship; said optical phase-and-amplitude modulator having an optical input receiving said optical carrier ($S_{OC}$), an optical output supplying said optical modulated signal ($\vec{S}_2$), and two electrical inputs configured for receiving said electrical output signals supplied by said electrical device.

4. The electrically controlled optical oscillator according to claim 3, wherein said optical phase-and-amplitude modulator comprises a first optical path and a second optical path in parallel to one another, the first optical path comprising a first optical amplitude modulator and an adjustable optical phase-shifter connected in series to said first optical amplitude modulator and configured for introducing a given phase shift, the second optical path comprising a second optical amplitude modulator, said first and second optical amplitude modulators having respective points of operation at rest and being controlled respectively by said electrical output signals supplied by said electrical device, and an adjustable optical phase-shifter.

5. The electrically controlled optical oscillator according to claim 4, wherein said relationship is a relationship of quadrature, and in addition said given phase shift is 90°.

6. The electrically controlled optical oscillator according to claim 5, wherein said electrical device is a directional coupler.

7. The electrically controlled optical oscillator according to claim 5, wherein said electrical device is a 90° hybrid coupler.

8. The electrically controlled optical oscillator according to claim 5, wherein said electrical device is a power divider.

9. The electrically controlled optical oscillator as in claim 1, wherein said laser source is an external-cavity laser.

10. An optical phase-locked loop, comprising:
an optical phase detector having a first optical input, configured for receiving an optical signal to be locked ($\vec{S}_1$), a second optical input configured for receiving a locked optical signal ($\vec{S}_2$), and an electrical output, configured for supplying an electrical error signal ($V_{PD}$) indicating the difference between the phase of said optical signal to be locked ($\vec{S}_1$) and the phase of said locked optical signal ($\vec{S}_2$); and
an electrically controlled optical oscillator generating a single subcarrier, having an electrical input configured for receiving an electrical driving signal ($V_{PDF}$) that is a function of said electrical error signal ($V_{PD}$) and an optical output configured for supplying said locked optical signal ($\vec{S}_2$);
said electrically controlled optical oscillator comprising an electrically controlled electrical oscillator having an input configured for receiving an electrical driving input signal ($V_{PDF}$) and an output configured for supplying an electrical driving output signal ($V_{EVCO}$) having a frequency ($F_{EVCO}$) that is a function of said electrical driving input signal ($V_{PDF}$), a continuous-wave laser source configured for supplying an optical carrier ($S_{OC}$); and
an optical modulator having an optical input connected to said laser source for receiving said optical carrier ($S_{OC}$), an electrical input connected to said output of said electrically controlled electrical oscillator for receiving said electrical driving output signal ($V_{EVCO}$), and an optical output configured for modulating said optical carrier ($S_{OC}$) with said electrical driving output signal ($V_{EVCO}$) and thus generating an optical modulated signal ($\vec{S}_2$);
wherein said electrically controlled optical oscillator is configured for generating an optical modulated signal ($\vec{S}_2$) with single optical subcarrier.

11. The optical phase-locked loop (1) according to claim 10, wherein said optical phase detector comprises:
an optical coupler having a first optical input configured for receiving said optical signal to be locked ($\vec{S}_1$), a second optical input configured for receiving said locked optical signal ($\vec{S}_2$) and an optical output configured for supplying a coupled optical signal ($\vec{S}_3$); and
a photodetector configured for receiving said coupled optical signal ($\vec{S}_3$) and for supplying said electrical error signal ($V_{PD}$).

12. The optical phase-locked loop according to claim 11, wherein said optical coupler comprises a 3 dB optical coupler.

13. The optical phase-locked loop according to claim 12, wherein said optical coupler comprises a 90° hybrid optical coupler.

14. The optical phase-locked loop as in claim 13, further comprising electrical loop filter set between said optical phase detector and said electrically controlled optical oscillator.

15. The optical phase-locked loop as in claim 14, further comprising means for control of polarization of a light signal set upstream of the input of the optical phase detector.

16. The optical phase-locked loop as in claim 15, further comprising optical amplification means set between said optical modulator and said optical phase-detector.

17. The optical phase-locked loop as in claim 16, further comprising optical filtering means set between said optical modulator and said optical amplification means.

* * * * *

UNITED STATES PATENT AND TRADEMARK OFFICE
CERTIFICATE OF CORRECTION

PATENT NO. : 8,405,897 B2
APPLICATION NO. : 12/733143
DATED : March 26, 2013
INVENTOR(S) : Ferrero et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 320 days.

Signed and Sealed this
First Day of September, 2015

Michelle K. Lee
*Director of the United States Patent and Trademark Office*